Patented Mar. 20, 1934

1,951,696

UNITED STATES PATENT OFFICE 1,951,696

PROCESS FOR THE MANUFACTURE OF ALKALI METAL SALTS OF FATTY ACIDS

Max Hofsäsz, Mannheim-Neuostheim, Germany, assignor to Shell Development Company, San Francisco, Calif., a corporation of Delaware No Drawing. Original application March 3, 1930, Serial No. 432,978. Divided and this application April 26, 1932, Serial No. 607,665. In Great Britain March 18, 1929

3 Claims. (Cl. 260—116)

My invention relates to a process for the manufacture of alkali metal salts of fatty acids.

I have found that by subjecting olefines such as ethylene, to an elevated temperature and pressure in the presence of water and alkaline substances such as alkali metal hydroxides or alkali metal phenolates, naphthenates, or other salts of the alkali metals and weak acids or mixtures which give rise to alkali metal hydroxides in the presence or absence of an inert liquid medium or a liquid medium which undergoes conversion during the reaction, the alkali metal salts of the acids corresponding to the initial olefines are formed.

The reaction may be illustrated by the following equation:

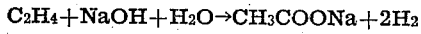
$$C_2H_4 + NaOH + H_2O \rightarrow CH_3COONa + 2H_2$$

involving the use of ethylene as the olefine and caustic soda as the alkali hydroxide.

From the above it is clear that a molecular reaction between the olefine and aqueous caustic soda takes place, whereby sodium acetate is formed together with hydrogen. If desired, the salt thus obtained may be converted in any suitable known manner into the fatty acid.

Sometimes it may be favourable to carry out the above reaction in the presence of an inert liquid medium, such as paraffin oil or other oils which are not affected under the conditions of the reaction, or in the presence of a liquid medium which undergoes conversion during the reaction. Particularly when the olefine is present in excess with regard to the amount of alkaline substance, a polymerization of the olefine may take place at the same time, owing to the elevated pressure and temperature which are employed.

The reaction temperature may be above 300° C. Favourable results are obtained at a temperature of 360° C. and a pressure of 46 atmospheres. At the same temperature an increase of pressure affects favourably the yield of alkali salt of the fatty acid. Further by increasing the quantity of water more of the desired reaction products may be obtained.

The hydrogen which is formed during the reaction may be advantageously employed to combine or react with suitable organic substances which are present in the mass under treatment. These substances then act as a liquid medium for the reaction and at the same time are converted into more valuable products.

As a liquid medium which undergoes conversion during the reaction organic substances which are capable of being hydrogenated or from which oxygen may be eliminated such as phenols, cresols, naphthenic acids, oleic acids and the like may for example be employed; ethyl alcohol is also a favourable liquid medium, being converted partly or wholly into acetic acid (sodium acetate) during the reaction.

The following examples illustrate how the invention may be carried into effect:

1. 250 grams of water and 90 grams of potassium hydroxide are brought into an autoclave having a volume of 2 litres. Thereafter ethylene at 20° C. is introduced into the autoclave until the pressure reaches 25.5 atmospheres. Thereafter the mass is heated to 400° C. and maintained at that temperature during one hour. After cooling the mass to room temperature the pressure amounts to about 38.5 atm. at 18° C. The gas is now drawn off into a gas container by release of pressure. The volume of the gas is 61.6 litres and the hydrogen content is 78.5%. The contents of the autoclave are dissolved in water and acidified with sulphuric acid, whereafter on distillation an aqueous distillate containing 71.5 grams of acetic acid is obtained.

2. 268 grams of water, 26.5 grams of anhydrous sodium carbonate and 56 grams of calcium oxide are brought into an autoclave having a volume of 2 litres. After introducing ethylene into the autoclave until the pressure reaches 25.5 atmospheres at 14° C. the mass is heated to 385–390° C. and maintained during one hour at said temperature. After cooling the pressure amounts to about 26 atm. at 60° C. After releasing the pressure 45 litres of a gas is obtained containing 23.2% of hydrogen. 13 grams of acetic acid are obtained from the mass in the autoclave as described in Example 1.

3. 90 grams of potassium hydroxide, 90 grams of ethylalcohol and 160 grams of water are brought into an autoclave having a volume of 2 litres, whereafter at 20° C. ethylene is introduced into the autoclave until the pressure reaches 24.5 atm. After heating during one hour at 360° C. the mass is cooled. The pressure in the autoclave is then about 61 atm. at 20° C. After release of pressure 104 litres of gas are obtained containing 59.0% of hydrogen. From the mass remaining in the autoclave 78.6 grams of acetic acid can be obtained as in Example 1. Moreover, 3.3 grams of liquid hydrocarbons boiling below 200° C., which are formed owing to polymerization of part of the ethylene, can be isolated from the reaction mass.

4. 50 grams of ethylene are compressed to a pressure of 25 atmospheres in an autoclave containing 360 grams of an aqueous solution containing 25% of potassium hydroxide. After heating during one hour at a temperature of 360° C. an amount of potassium acetate corresponding to 72 grams of acetic acid, 100 litres of a gas containing 90 per cent of hydrogen and a few grams of hydrocarbons, which can be used as a light gasoline, are obtained.

5. 47 grams of raw phenols (98 per cent), 25 grams of caustic soda and 250 grams of water are brought into an autoclave, having a volume of 2 litres. Ethylene is introduced into the autoclave, until the pressure reaches 25 atmospheres, the mass is heated during half an hour at 416° C. After working up the reaction mass the following products are obtained: 25 grams of a neutral oil, boiling from 75–230° C., 19.5 grams of acetic acid, 18.4 litres of hydrogen diluted with unconverted ethylene and 6 grams of unconverted phenols.

It should be understood that it is not essential to use pure olefines, but that the invention may also be applied to mixtures of the said compounds with other substances. Thus, for instance, it is possible to use ethylene and/or its homologues containing products which are obtained by cracking certain mineral oil products or by the destructive hydrogenation of carbonaceous materials, such as coal, brown coal, tar, cellulose, lignite, wood, and hydrocarbons, such as mineral oils, and distillation or extraction products or residues obtained therefrom. If necessary, such products may be subjected to a preliminary treatment, such as cracking or dehydrogenation for the purpose of increasing their content of ethylene and/or its homologues. Furthermore, propylene can be converted into sodium propionate in a manner similar to that for preparing sodium acetate from ethylene. The expression "alkali metal salts" is for the purpose of this invention deemed to include ammonium salts.

The term "alkaline reacting compounds of alkali metals" appearing in the claims is intended to include alkali metal hydroxides, alkali metal phenolates, naphthenate or other salts of alkali metals and weak acids or mixtures which give rise to alkali metal hydroxides under the reaction conditions or mixtures of any one of the said substances.

This case is a division of my copending application Serial No. 432,978, filed March 3, 1930.

What I claim is:

1. A process for the manufacture of alkali metal salts of fatty acids from olefines, which consists in subjecting olefines to elevated temperatures and pressures in the presence of alkaline reacting compounds of alkali metals and water.

2. A process as claimed in claim 1, wherein the reaction is effected in the presence of an inert liquid medium.

3. A process as set forth in claim 1, wherein the reaction medium comprises besides water at least one organic compound which, under the reaction conditions, reacts with the liberated hydrogen.

MAX HOFSÄSZ.